(12) United States Patent
Pa

(10) Patent No.: US 8,322,577 B2
(45) Date of Patent: Dec. 4, 2012

(54) SYRINGE WITH IMPROVED PLUNGER

(75) Inventor: Ponna Pa, Bear, DE (US)

(73) Assignee: Agilent Technologies, Inc., Santa Clara, CA (US)

( * ) Notice: Subject to any disclaimer, the term of this patent is extended or adjusted under 35 U.S.C. 154(b) by 400 days.

(21) Appl. No.: 12/429,745

(22) Filed: Apr. 24, 2009

(65) Prior Publication Data

US 2010/0270335 A1  Oct. 28, 2010

(51) Int. Cl.
- *A61M 5/315* (2006.01)
- *A61M 5/178* (2006.01)
- *G01F 11/00* (2006.01)
- *G01N 1/14* (2006.01)
- *B01L 3/02* (2006.01)

(52) U.S. Cl. ........ 222/386; 604/218; 604/222; 604/230; 73/864.13; 73/864.16

(58) Field of Classification Search .................. 222/309, 222/386, 386.5; 604/187, 218, 220–222, 604/224, 225, 229, 230, 576, 578; 73/864.13, 73/864.16–864, 18, 864.16–864.18; 600/576, 600/578

See application file for complete search history.

(56) References Cited

U.S. PATENT DOCUMENTS

| 3,281,023 A | 10/1966 | Bruck et al. |
| 3,481,323 A | 12/1969 | Cook et al. |
| 3,577,850 A | 5/1971 | Harris |
| 3,581,956 A | 6/1971 | Reid |
| 3,677,448 A | 7/1972 | Harris |
| 3,730,389 A | 5/1973 | Harris |
| 3,742,949 A * | 7/1973 | Hill .................. 604/222 |
| 3,791,560 A * | 2/1974 | Harris, Sr. ............ 222/386 |
| 3,809,298 A | 5/1974 | Harris |
| 3,831,601 A | 8/1974 | Kessell |
| 3,901,413 A | 8/1975 | Harris |
| 4,024,865 A | 5/1977 | Howlett |
| 4,034,755 A | 7/1977 | Schultz |
| 4,327,595 A | 5/1982 | Schultz |
| 4,500,310 A * | 2/1985 | Christinger ............ 604/228 |
| 4,543,093 A * | 9/1985 | Christinger ............ 604/228 |
| 4,615,468 A | 10/1986 | Gay |
| 4,820,278 A | 4/1989 | Balisky |
| 4,997,423 A * | 3/1991 | Okuda et al. ............ 604/230 |
| 5,009,646 A * | 4/1991 | Sudo et al. .............. 604/230 |

(Continued)

OTHER PUBLICATIONS

Tokuno et al., "A modified microsyringe for extracellular recording of neuronal activity," *Neuroscience Research*, 31: p. 251-155; Elsevier, 1998.

*Primary Examiner* — Darren W Gorman

(74) *Attorney, Agent, or Firm* — Milstein Zhang & Wu LLC

(57) ABSTRACT

A plunger for a syringe used to inject gas and liquid chromatography samples has an end portion surrounded by a flexible sleeve. The sleeve forms a seal in the bore of a barrel traversed by the plunger, the bore being in fluid communication with a cannula attached to the end of the barrel. The plunger has an end surface that is exposed and is flush with an annular end surface of the sleeve. The plunger end surface, and not the sleeve, contacts the cannula upon injection and avoids imposing cyclical hoop stresses on the barrel which tend to crack the barrel after a finite number of cycles. In a further embodiment, a thin layer of sleeve material covers the end surface of the plunger. The thin layer avoids inducing significant barrel stress.

15 Claims, 2 Drawing Sheets

U.S. PATENT DOCUMENTS

| | | | |
|---|---|---|---|
| 5,061,247 A * | 10/1991 | Akaike et al. | 604/187 |
| 5,314,416 A * | 5/1994 | Lewis et al. | 604/219 |
| 7,111,848 B2 * | 9/2006 | Tachikawa et al. | 277/535 |
| 2008/0115796 A1 | 5/2008 | Montanari et al. | |

* cited by examiner

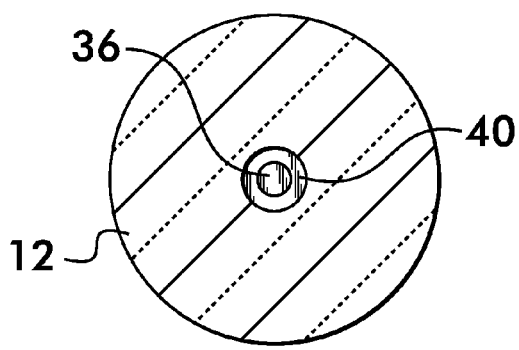
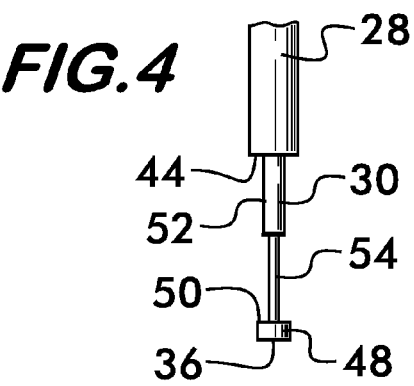
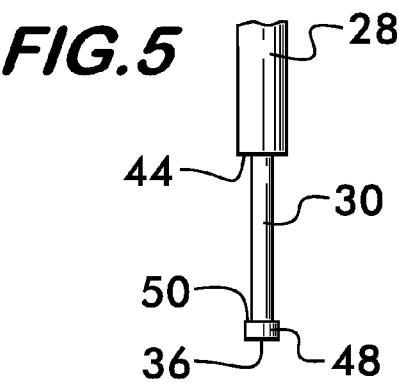
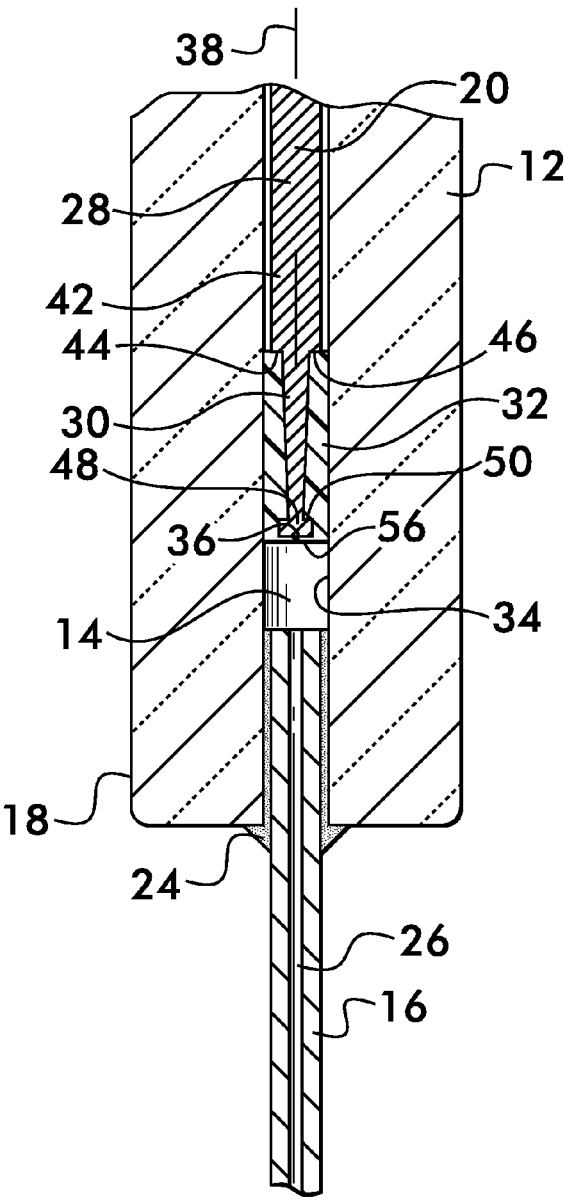

SYRINGE WITH IMPROVED PLUNGER

FIELD OF THE INVENTION

This invention concerns syringes for injecting liquid and gaseous samples into chromatographs.

BACKGROUND

Syringes for injecting gas or liquid samples into a chromatograph for analysis according to the prior art comprise an elongate glass barrel having a coaxial bore. A stainless steel cannula extends from one end of the barrel, the cannula being positioned partially within and in fluid communication with the barrel bore. A plunger extends from the opposite end of the barrel and is movable lengthwise through the bore toward and away from the cannula. The plunger is formed of stainless steel and has a tip made of polytetrafluoroethylene (PTFE). Glass and stainless steel are the preferred materials for the barrel, cannula, and plunger because they are robust, inert materials which will give long service and will not contaminate the samples with which they come into contact. PTFE is used as the plunger tip also because it is inert, but, unlike the stainless steel, it can more easily form a gas tight seal within the bore which enables the syringe to draw and inject gas samples into the chromatograph.

Although the PTFE tip provides an effective seal it is not without disadvantages. The disadvantages arise largely from PTFE's propensity for cold flow when subjected to stress. This effect manifests itself destructively during injection of gas or liquid into the chromatograph. To ensure accuracy of analysis and have minimum adverse effect on chromatograph performance the injection must take place rapidly so that the sample is injected into the chromatograph as quickly as possible. Injection durations measured in milliseconds for microliter syringes are desirable to meet accuracy requirements. To achieve short injection durations requires rapid movement of the plunger toward the cannula. To ensure that as much of the sample is injected as possible it is customary to have the PTFE tip contact the end of the cannula within the barrel bore at the end of its stroke. Large impact forces, as great as 4 kg, between the PTFE tip and the stainless steel cannula and the end of the glass barrel are the result. These relatively large impact forces impose large compression stresses on the PTFE tip, which, if unconstrained, would tend to cold flow in response to the stress and "mushroom" radially outwardly. However, even in its undeformed state, the tip engages the bore with an interference fit. The barrel bore therefore constrains deformation of the tip so the radial tip stress imposed by the impact further increases the hoop stresses in the barrel locally in the region where the cannula is attached to the barrel. This region of the barrel is inherently weak because residual stresses are concentrated there as a result of the manufacturing process which attaches the cannula to the barrel. Repeated injections subject the barrel to repeated increases and decreases in stress, causing the barrel to crack, sometimes after as few as 100 injections.

Another disadvantage attributable to the cold flow characteristics of PTFE is the lost motion between the stainless steel plunger and the PTFE tip. The tip is swaged to the plunger. Upon impact of the tip against the cannula and the end of the barrel, forces are imposed between the plunger and the tip which cause stresses in the PTFE. The PTFE cold flows in response and the swaged attachment between the tip and the plunger is degraded. Although the PTFE tip remains attached to the plunger it is able to move relatively to the plunger, resulting in what is commonly known as "lost motion". Lost motion manifests itself during drawing and injection of the sample, because friction between the tip and the barrel prevents the tip from moving until the lost motion between the plunger and the tip is taken up. This adversely affects the accuracy of the analysis and the performance of the chromatograph because, when there is lost motion, motion of the plunger does not correspond exactly to motion of the tip, and it is the motion of the tip which draws and injects the sample, while it is the motion of the plunger which is controlled and measurable. Inaccuracies are introduced when the motion of the plunger does not correspond to motion of the tip.

Yet another disadvantage attributable to cold flow of the PTFE is the propensity of the tip to extrude into the cannula. Each time the tip contacts the cannula and the end of the barrel during an injection, compression stresses are induced in the tip. In response the tip tends to deform radially outwardly, but cannot because it is prevented by contact with the sidewall of the bore. However, the tip is free to expand into the bore of the cannula, there being no surface there to restrain tip expansion due to the compression stress. Expansion occurs with each injection and eventually a projection is formed which extends axially from the end of the tip. This projection grows with each injection, and may break off, either within the bore of the barrel or within the bore of the cannula. Either condition is unacceptable. If the projection is free within the bore of the barrel it adversely affects the accuracy of the draw and the injection. If the projection breaks off within the bore of the cannula it can block the cannula and prevent injection altogether. There is clearly a need for an improved plunger for chromatograph syringes which addresses the disadvantages of the prior art.

SUMMARY

The invention concerns a plunger and a syringe using the plunger. The syringe comprises an elongate barrel having first and second ends and a bore therethrough. A cannula is attached to the first end of the barrel and extends into the bore. The cannula is in fluid communication with the bore. The plunger is positioned within the bore of the barrel. The plunger extends from the second end of the bore and is movable toward and away from the cannula within the bore. The plunger comprises an elongate rod having a longitudinal axis and an end portion. An end surface is positioned on the end portion of the rod. The end surface is oriented transversely to the longitudinal axis of the rod. A flexible sleeve surrounds the end portion of the rod. The sleeve contacts the bore and provides a seal between the plunger and the barrel. An end surface is positioned on the sleeve. The end surface of the sleeve is oriented transversely to the longitudinal axis of the rod and forms an annulus surrounding the end surface of the rod. The end surface of the rod is not covered by the end surface of the sleeve thereby permitting the end surface of the rod to contact the cannula.

The end surface of the rod may have a diameter greater than the inner diameter of the cannula. The end surface of the rod as well as the end surface of the sleeve may be oriented perpendicularly to the longitudinal axis. In one embodiment of the plunger, the end surface of the rod is flush with the end surface of the sleeve. The end portion of the rod may have a smaller diameter than an adjacent portion of the rod, thereby forming a shoulder between the adjacent portion and the end portion of the rod. The sleeve has an opposite end surface oriented perpendicularly to the longitudinal axis. The opposite end surface of the sleeve contacts the shoulder. In another embodiment, the end portion of the rod is tapered such that the diameter of the end portion decreases with increasing distance from the shoulder. Alternately, the end portion of the rod may comprise first and second segments attached to one another end to end. The second segment has a smaller diameter than the first segment. The second segment may be positioned between the first segment and the end surface of the rod.

The end portion of the rod further may also comprise a head. The head has a larger diameter than the end portion of the rod between the shoulder and the head. The end surface of the rod is positioned on the head. A second shoulder is positioned adjacent to the head. The sleeve contacts the second shoulder. The sleeve may comprise PTFE, the plunger may comprise stainless steel and the barrel may comprise glass.

In an alternate embodiment of the syringe and the plunger, the end surface of the rod may be covered by a flexible layer. The layer may have a maximum thickness of about 0.78 times the bore diameter of the barrel. For practical applications the layer may have a thickness between about 0.1 mm and about 0.84 mm, with a layer thickness of about 0.25 mm being advantageous for certain bore diameters.

BRIEF DESCRIPTION OF THE DRAWINGS

FIG. 3 is a cross sectional view taken at line 3-3 of FIG. 2;

FIG. 4 is a side view of an embodiment of a plunger according to the invention;

FIG. 5 is a side view of another embodiment of a plunger according to the invention; and FIG. 6 is a partial longitudinal sectional view of another syringe embodiment according to the invention.

DETAILED DESCRIPTION OF EMBODIMENTS

Figure 1:
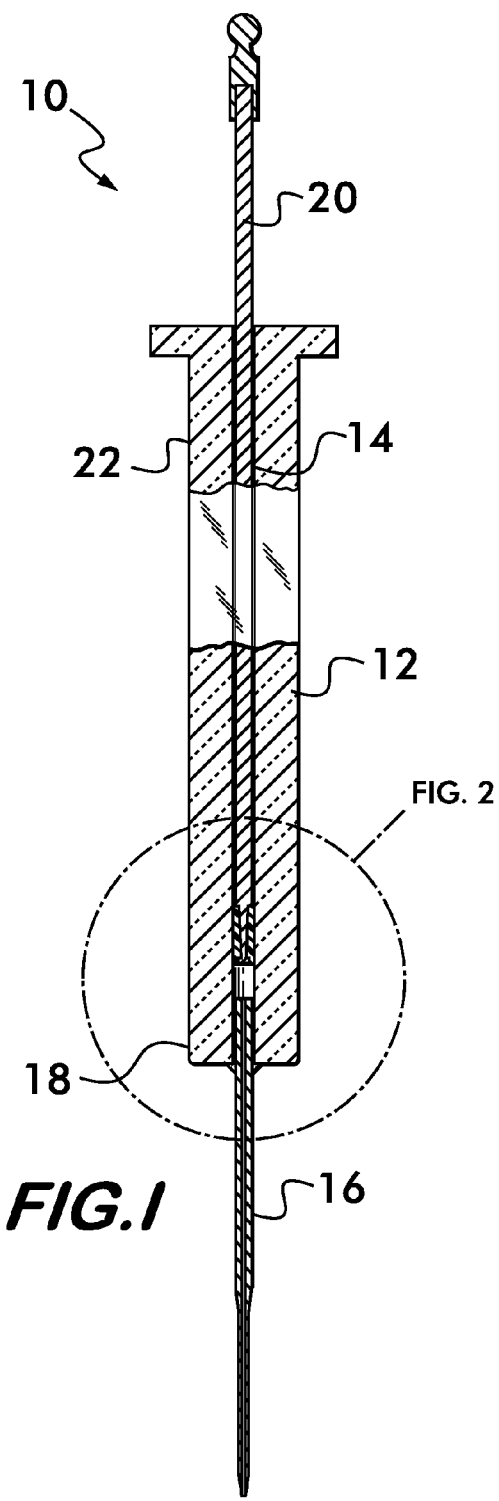
FIG. 1 is a partial sectional side view of a syringe according to the invention.

FIG. 1 is a partial sectional view of a syringe 10 according to the invention. Syringe 10 comprises a barrel 12 having a bore 14 therethrough. A needle or cannula 16 is attached to one end 18 of the barrel 12, and a plunger 20 is positioned within the bore 14 and extends out of the bore at the opposite end 22 of the barrel. In example syringe embodiments suitable for use to inject liquid or gas samples into a chromatograph, the barrel may be made of borosilicate glass, and the cannula and the plunger may be made of stainless steel. For syringes which inject microliter sample volumes, the diameter of bore 14 may be, for example, 0.485 mm for a 10 microliter syringe, 0.767 for a 25 microliter syringe, and 1.08 mm for a 50 microliter syringe. The stroke of the plunger 20 may be about 54.1 mm. The cannula 16 may have an inner diameter of about 0.1 mm.

Figure 2:
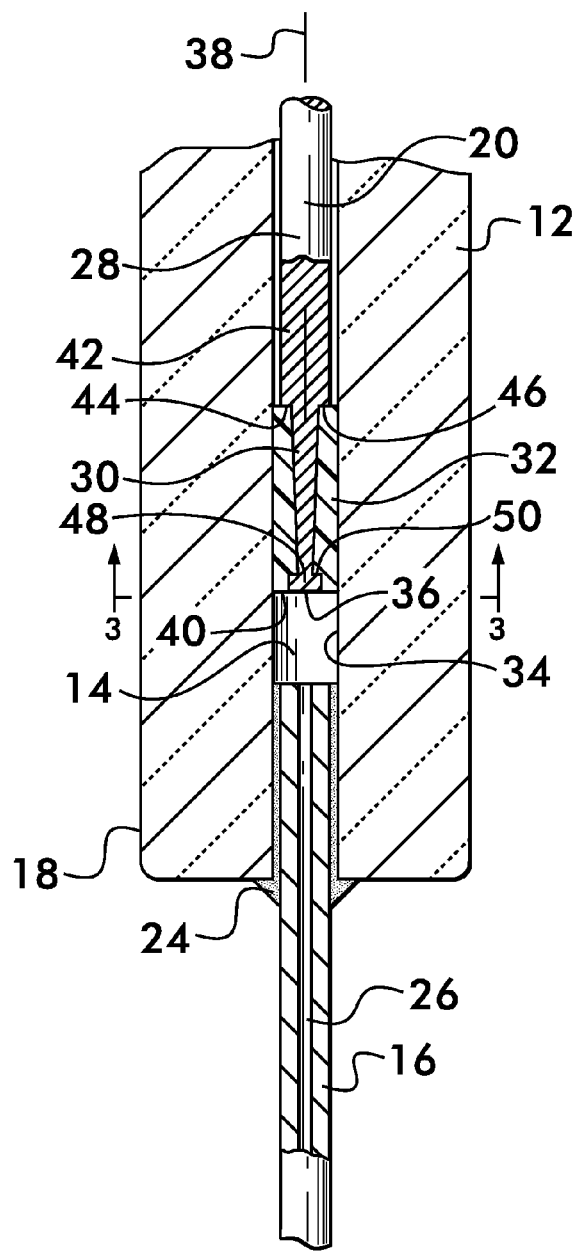
FIG. 2 is a partial longitudinal sectional view of the syringe shown in FIG. 1 taken at circle 2 and shown on an enlarged scale.

As shown in FIG. 2, the cannula 16 is positioned partially within the bore 14 of the barrel 12 and is adhesively bonded therein by a layer of epoxy 24. The cannula also has a bore 26 which is in fluid communication with the bore 14 of barrel 12. Plunger 20 comprises an elongate rod 28 which is smaller in diameter than bore 14 to facilitate motion of the plunger toward and away from the cannula 16, allowing the syringe to draw a sample into the bore upon motion of the plunger away from the cannula, and inject the sample into, for example, a chromatograph, upon motion of the plunger toward the cannula.

Rod 28 has an end portion 30 which carries a flexible sleeve 32. Sleeve 32 seals the bore 14 gas tight and allows motion of the plunger 20 to draw and inject both liquid and gaseous samples. Sleeve 32 surrounds rod end portion 30 and is larger in diameter than bore 14 so as to contact the sidewall 34 of bore 14 and form a seal therebetween. Sleeve 32 may be formed of PTFE, as well as other flexible materials such as plastics which are inert with respect to the particular sample with which the syringe will be used.

An end surface 36 of rod 28 is positioned on the end portion 30. The end surface 36 is oriented transversely to, and preferably perpendicularly to the longitudinal axis 38 of the rod 28. Sleeve 32 also has an end surface 40 which forms an annulus surrounding the rod end surface 36 as best shown in FIG. 3. Sleeve end surface 40 is also oriented transversely to longitudinal axis 38 and is preferably flush with the end surface 36 of rod 28 as shown in FIG. 2. End surface 40 of sleeve 32 does not cover end surface 36 of rod 28, i.e., end surface 36 of rod 28 is exposed, allowing it to contact cannula 16 during injection. To ensure the desired contact between the rod end surface 36 and the cannula 16 the end surface 36 has a diameter greater than the inner diameter of the cannula 16 as shown.

When sleeve 32 is formed of PTFE: it may be swaged onto the end portion 30 of rod 28. To help retain the sleeve to the rod, the end portion 30 has a smaller diameter than the section 42 of the rod adjacent to the end portion 30, thereby forming a shoulder 44. Sleeve 32 has a second end surface 46 opposite to end surface 40 which contacts the shoulder 44. Furthermore, a head 48 is positioned on the end portion 30 of rod 28. The rod end surface 36 is carried on head 48. Head 48 also has a larger diameter than the end portion 30, thereby forming a second shoulder 50 adjacent to head 48 and facing shoulder 44. Sleeve 32 also contacts the second shoulder 50. This arrangement of facing shoulders 44 and 50 engaged with the sleeve 32 helps prevent lost motion between the sleeve and the rod upon motion of the rod toward and away from the cannula.

There are several practical embodiments for the rod end portion 30. As shown in FIG. 2, end portion 30 may be tapered such that the diameter of the end portion decreases with increasing distance from the shoulder 44. Alternately, as shown in FIG. 4, the end portion 30 may comprise first and second segments 52 and 54 attached to one another end to end. The second segment 54, positioned between the first segment and the end surface 36 of the rod may have a smaller diameter than the first segment. In another embodiment shown in FIG. 5, the rod end portion 30 has a constant cross sectional diameter.

Another syringe and plunger embodiment is shown in FIG. 6, wherein the end surface 36 of rod 28 is covered by a flexible layer 56. Layer 56 may be made of the same material, or a different material, as forms the sleeve 32. Finite element analysis was used to predict how thick layer 56 should be in relation to the syringe bore diameter 14 and not cause cracking of the barrel over a reasonable amount of plunger cycles which may be considered to provide an "infinite" life to the syringe. For an impact pressure of 150 MPa at the plunger end surface, the analysis predicts that the layer 56 should be less than or equal to 0.78 times the bore diameter to achieve a syringe having an "infinite" life. Thus, for a 10 microliter syringe having a bore diameter of 0.485 mm, the thickness of layer 56 should be less than or equal to about 0.37 mm. For a 25 microliter syringe having a bore diameter of 0.767 mm, the thickness of layer 56 should be less than or equal to about 0.6 mm. For a 50 microliter syringe having a bore diameter of 1.08 mm, the thickness of layer 56 should be less than or equal to about 0.84 mm. It is advantageous to limit the thickness of the layer 56 to less than the maximum predicted by the aforementioned functional relationship. For example, for the 10 microliter syringe, it is advantageous that the thickness of layer 56 be limited to about 0.25 mm or less. This provides a factor of safety which is expected to further increase the life of the syringe. For practical applications, layer 56 may have a thickness of 0.1 mm.

The plunger according to the invention provides syringes which avoid the disadvantages of the prior art. Because the rod end surface 36 is exposed in one embodiment, it contacts the cannula 16 upon injection of the sample. The flexible sleeve does not contact the cannula in this embodiment, does not therefore experience significant compression forces, and does not try to expand radially outwardly to any significant degree. Thus, the end of the barrel 18 is not subjected to repeated increases in hoop stress with each injection, and therefore is less likely to fail by cracking. Tests have shown a barrel life in excess of 2,000 cycles without a failure. This compares very favorably with barrel failures after only a few hundred cycles as experienced by syringes according to the prior art. Furthermore, since the softer and flexible sleeve does not contact the cannula, the material does not extrude through the cannula bore 26 and a projection does not form at the tip of the plunger 20. Additionally, the use of facing shoulders 44 and 50 to capture the sleeve 32 prevents lost motion between the sleeve and the rod 28.

In the embodiment having a thin layer of sleeve material covering the end surface of the rod, the thinness of the layer does not induce significant stress in the barrel when it is compressed during sample injection. The thinness also prevents any significant extrusion of the sleeve material into the cannula, thereby avoiding the disadvantages of the prior art.

What is claimed is:

1. A syringe, comprising:
    an elongate barrel having first and second ends and a bore therethrough;
    a cannula attached to said first end and extending into said bore, said cannula being in fluid communication with said bore;
    a plunger positioned within said bore, said plunger extending from said second end of said bore and being movable toward and away from said cannula within said bore, said plunger comprising:
        an elongate rod having a longitudinal axis and an end portion, wherein the end portion has a smaller diameter than a diameter of a remainder of the rod, thereby forming a first shoulder between the end portion and the remainder of the rod, and wherein the end portion comprises a head having a larger diameter than a diameter of a remainder of the end portion, thereby forming a second shoulder facing the first shoulder, wherein the first shoulder and the second shoulder are oriented perpendicularly to the longitudinal axis of said elongate rod; an end surface of the head being oriented transversely to said longitudinal axis of said rod; and
        a flexible sleeve in a shape of a cylinder surrounding said end portion, said sleeve contacting said bore and providing a seal between said plunger and said barrel, wherein the flexible sleeve has a first end surface defining an end of the cylinder, wherein the first end surface contacting and covering the first shoulder, and the flexible sleeve wraps around the second shoulder and the head in a snug fit such that a flexible layer of the flexible sleeve covers the end surface of the head, said flexible layer having a thickness less than or equal to about 0.78 times the diameter of said bore.

2. The syringe according to claim 1, wherein said layer has a thickness less than or equal to about 0.84 mm.

3. The syringe according to claim 1, wherein said layer has a thickness of about 0.25 mm.

4. The syringe according to claim 1, wherein said sleeve and said layer are formed of PTFE.

5. The syringe according to claim 1, wherein the bore has a diameter less than or equal to about 1.08 mm.

6. The syringe according to claim 2, wherein the bore has a diameter less than or equal to about 1.08 mm.

7. The syringe according to claim 3, wherein the bore has a diameter less than or equal to about 0.485 mm.

8. The syringe according to claim 4, wherein the bore has a diameter less than or equal to about 1.08 mm.

9. A plunger, comprising:
    an elongate rod having a longitudinal axis and an end portion, wherein the end portion has a smaller diameter than a diameter of a remainder of the rod, thereby forming a first shoulder between the end portion and the remainder of the elongate rod, and wherein the end portion comprises a head having a larger diameter than a diameter of a remainder of the end portion, thereby forming a second shoulder facing the first shoulder, wherein the first shoulder and the second shoulder are oriented perpendicularly to the longitudinal axis of said rod; an end surface of the head being oriented transversely to said longitudinal axis of said rod; and
    a flexible sleeve in a shape of a cylinder surrounding said end portion, wherein the flexible sleeve has a first end surface defining an end of the cylinder, wherein the first end surface contacting and covering the first shoulder, and the flexible sleeve wraps around the second shoulder and the head in a snug fit such that a flexible layer of the flexible sleeve covers the end surface of the head, said flexible layer having a thickness from about 0.1 mm to about 0.84 mm.

10. The plunger according to claim 9, wherein said end portion of said rod is tapered.

11. The plunger according to claim 9, wherein said layer has a thickness of about 0. 25 mm.

12. The plunger according to claim 9, wherein said sleeve and said layer are formed of PTFE.

13. The plunger according to claim 9, wherein the elongated rod has a diameter less than or equal to about 1.08 mm.

14. The plunger according to claim 11, wherein the elongated rod has a diameter less than or equal to about 0.485 mm.

15. The plunger according to claim 12, wherein the elongated rod has a diameter less than or equal to about 1.08 mm.

* * * * *